United States Patent

Yamada et al.

(10) Patent No.: US 9,212,023 B2
(45) Date of Patent: Dec. 15, 2015

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Kazuhiro Yamada, Aichi-ken (JP); Akira Sumiyashiki, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 205 days.

(21) Appl. No.: 13/960,908

(22) Filed: Aug. 7, 2013

(65) Prior Publication Data

US 2014/0042256 A1 Feb. 13, 2014

(30) Foreign Application Priority Data

Aug. 10, 2012 (JP) ................................. 2012-178712

(51) Int. Cl.
*B65H 75/44* (2006.01)
*B60R 22/38* (2006.01)

(52) U.S. Cl.
CPC ............ *B65H 75/4434* (2013.01); *B60R 22/38* (2013.01)

(58) Field of Classification Search
CPC ........ B60R 22/38; B60R 22/41; B60R 22/405
See application file for complete search history.

(56) References Cited

U.S. PATENT DOCUMENTS

| 7,681,824 | B2 * | 3/2010 | Mori | 242/382.1 |
| 7,942,361 | B2 * | 5/2011 | Mori | 242/383.1 |
| 8,118,249 | B2 * | 2/2012 | Aihara et al. | 242/383.1 |
| 8,740,126 | B2 * | 6/2014 | Tatsuma et al. | 242/383.1 |
| 2007/0290091 | A1 * | 12/2007 | Mori | 242/383.1 |
| 2009/0218432 | A1 * | 9/2009 | Aihara et al. | 242/396.2 |
| 2010/0147986 | A1 * | 6/2010 | Mori | 242/383.1 |
| 2011/0127363 | A1 * | 6/2011 | Tatsuma et al. | 242/383.2 |

FOREIGN PATENT DOCUMENTS

JP 2008024284 A 2/2008

* cited by examiner

*Primary Examiner* — Sang Kim
(74) *Attorney, Agent, or Firm* — Roberts Mlotkowski Safran & Cole, PC

(57) ABSTRACT

If a V-gear abruptly rotates in a pulled-out direction due to reaction generated by rotation in a take-up direction being stopped when rotating in a take-up direction, a restriction body restricts swinging of a W-pawl in operation direction, so that lock of pulling-out of a webbing from a spool is suppressed. An insertion portion of a frictional spring of the restriction body is caught by an abut portion and a catching portion of a support hole. At an opening-side portion of the support hole, an enlarged portion is formed such that a position other than a position of the catching portion at the opening-side portion is enlarged compared to that of the catching portion. Even if the minimum-diameter of the support hole is small, strength of a molding portion for the support hole in a mold for the V-gear can be improved and lifetime thereof can be longer.

5 Claims, 5 Drawing Sheets

WEBBING TAKE-UP DEVICE

CROSS-REFERENCE TO RELATED APPLICATION

This application claims priority under 35 USC 119 from Japanese Patent Application No. 2012-178712 filed Aug. 10, 2012, the disclosure of which is incorporated by reference herein.

BACKGROUND OF THE INVENTION

1. Field of the Invention

The present invention relates to a webbing take-up device in which a webbing worn by an occupant is taken up on a take-up shaft.

2. Related Art

In a webbing take-up device disclosed in Japanese Patent Application Laid-Open (JP-A) No. 2008-24284, when a spool and a V-gear abruptly is rotated in the pulled out direction, an inertia mass of the V-gear swings, so that a lock pawl is operated to regulate the rotation of the spool in the pulled out direction.

Further, one end of a frictional spring is rotatably supported inside a hollow space of a support pin in the V-gear, and a lever and a cover are attached to the frictional spring. Then, when the spool and the V-gear rotate, friction force is generated in the cover, so the frictional spring, the lever, and the cover rotate.

When the spool and the V-gear rotate in the pulled out direction, the lever rotates to a non-abut position, so that the swinging of the inertia mass is permitted. Meanwhile, when the spool and the V-gear rotate in the take-up direction, the lever rotates to an abut position, so that the swinging of the inertia mass is restricted.

Since the diameter of the frictional spring is small, there is a need to suppress an inclination of one end of the frictional spring with respect to the hollow space of the support pin by decreasing the diameter of the hollow space of the support pin in the V-gear.

However, if the diameter of the hollow space of the support pin is decreased, the strength of the molding portion for the hollow space of the support pin in the mold that molds the V-gear decreases, and hence there is a possibility that the lifetime of the mold may be shortened.

SUMMARY OF THE INVENTION

The present invention has been made in view of the above-described circumstance, and the present invention to obtain a webbing take-up device capable of making a lifetime of a mold for molding a rotation body to be long.

According to a first aspect of the present invention, there is provided a webbing take-up device including: a take-up shaft configured to be able to take-up a webbing which is worn by an occupant, the webbing being taken-up by rotating in a take-up direction and the webbing being pulled out by rotating in a pulled out direction; a rotation body that is provided with a support hole at which a catching portion and an enlarged portion are provided in a circumferential direction of the support hole, the support hole being enlarged at a position of the enlarged portion compared to at a position of the catching portion, and the rotation body being rotatable with rotation of the take-up shaft; a regulation member that regulates rotation of the take-up shaft in a pulled out direction by being operated; an operation member that is provided in the rotation body, the regulation member being operated by the operation member being displacing when the rotation body rotates in the pulled out direction at a predetermined speed or more; and a restriction body that is provided with a support portion that is supported by the support hole, the restriction body being movable between a permission position and a restriction position due to a friction force being generated when the rotation body is rotated in a state in which inclination of the support portion with respect to the support hole is stopped by the catching portion, the restriction body moving, when the rotation body rotates in the pulled out direction, to the permission position so as to permit displacement of the operation member, and the restriction body moving, when the rotation body rotates in the take-up direction, to the restriction position so as to restrict displacement of the operation member.

According to a second aspect of the present invention, there is provided the webbing take-up device according to the first aspect of the present invention, wherein the restriction body is rotatable between the permission position and the restriction position in the state in which inclination of the support portion with respect to the support hole is stopped by the catching portion.

According to a third aspect of the present invention, there is provided the webbing take-up device according to the first aspect of the present invention, wherein the enlarged portion is provided up to a position further toward an inner side in an axial direction of the support hole than the catching portion.

In the aspects, it is possible that one end of the support hole is opened, and the catching portion and the enlarged portion are formed at an opening end side of the support hole.

In the webbing take-up device according to the first aspect of the present invention, the webbing is taken up by the rotation of the take-up shaft in the take-up direction and the webbing is pulled out from the take-up shaft by the rotation of the take-up shaft in the pulled out direction. In addition, the rotation body is rotatable accompanying with the rotation of the take-up shaft, and the rotation body is provided with the operation member. When the rotation body rotates at the predetermined speed or more in the pulled out direction, due to the operation member being displaced, so that the regulation member is operated to regulate the rotation of the take-up shaft in the pulled out direction.

Further, the support portion of the restriction body is supported by the support hole of the rotation body. The restriction body is movable between the permission position and the restriction position due to the friction force being generated in the restriction body when the rotation body is rotated in the state in which inclination of the support portion with respect to the support hole is stopped by the catching portion of the support hole.

In addition, when the rotation body rotates in the pulled out direction, the restriction body is moved to the permission position so as to permit the displacement of the operation member. Meanwhile, when the rotation body rotates in the take-up direction, the restriction body is moved to the restriction position so as to restrict the displacement of the operation member.

Here, the enlarged portion is provided at the support hole in addition to the catching portion in the circumferential direction, and the support hole is formed by enlarging at the position of the enlarged portion compared to the position of the catching portion. For this reason, it is possible to improve the strength of the support hole molding portion in the mold that molds the rotation body and hence to make longer the lifetime of the mold.

In the webbing take-up device according to the second aspect of the present invention, the restriction body is rotatable between the permission position and the restriction position in the state in which the inclination of the support portion with respect to the support hole is stopped by the catching portion of the support hole. For this reason, even if the restriction body rotates between the permission position and the restriction position, it is possible to stop the inclination of the support portion with respect to the support hole.

In the webbing take-up device according to the third aspect of the present invention, the enlarged portion is provided up to the position further toward the inner side in the axial direction of the support hole than the catching portion of the support hole. For this reason, it is possible to further improve the strength of the support hole molding portion in the mold that molds the rotation body and hence to further make long the lifetime of the mold.

BRIEF DESCRIPTION OF THE DRAWINGS

An Embodiment of the invention will be described in detail with reference to the following figures, wherein.

DETAILED DESCRIPTION OF THE INVENTION

Figure 1:
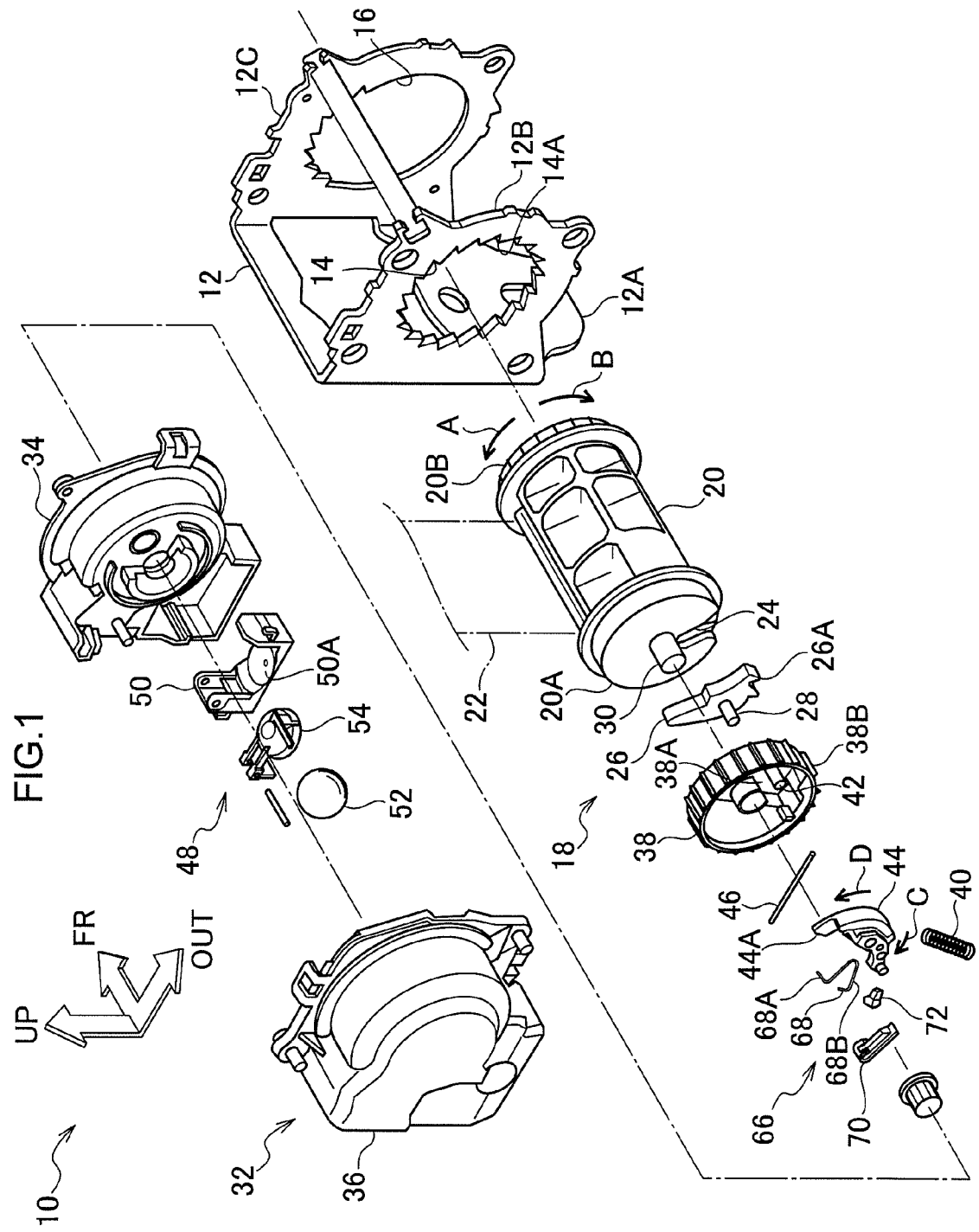
FIG. 1 is an exploded perspective view illustrating a webbing take-up device according to an embodiment of the present invention when viewed from the diagonal direction of the rear side, the outer side, and the upper side.

In FIG. 1, a webbing take-up device 10 according to an exemplary embodiment of the present invention is illustrated as an exploded perspective view when viewed from the diagonal direction at the rear side, the outer side, and the upper side. Furthermore, in the drawings, the front side (for example, the front side of the vehicle) of the webbing take-up device 10 is indicated by the arrow FR, the outer side (for example, the outer side in the vehicle width direction) of the webbing take-up device 10 is indicated by the arrow OUT, and the upper side thereof is indicated by the arrow UP.

As shown in FIG. 1, the webbing take-up device 10 according to the embodiment includes a plate-like frame 12 which has a U-shaped cross-section. A back plate 12A is provided at the inner side of the frame 12, and the frame 12 is fixed to the vehicle body at the back plate 12A, so that the webbing take-up device 10 is installed in the vehicle body. A leg plate 12B and a leg plate 12C are respectively provided at the rear side and the front side of the frame 12, and the leg plate 12B and the leg plate 12C face each other in the front and rear direction.

In the leg plate 12B and the leg plate 12C, substantially circular arrangement holes 14 and 16 are respectively formed so as to penetrate the leg plate 12B and the leg plate 12C, and the arrangement hole 14 and the arrangement hole 16 face each other in the front and rear direction. Further, at the entire circumferential portion of the arrangement hole 14, ratchet teeth 14A (inner teeth) that constitute a lock mechanism 18 as a regulation mechanism are formed.

A substantially circular cylinder (columnar) spool 20 as a take-up shaft is provided between the leg plate 12B and the leg plate 12C of the frame 12, one end 20A at the rear side of the spool 20 (the leg plate 12B side) is disposed inside the arrangement hole 14 of the leg plate 12B, and the other end 20B at the front side of the spool 20 (the leg plate 12C side) is disposed inside the arrangement hole 16 of the leg plate 12C. Accordingly, the spool 20 is disposed so as to be rotatable in the circumferential direction while the axial direction thereof is parallel to the front and rear direction.

A base end of an elongated belt-like webbing 22 (belt) is caught (anchored) by the spool 20, and the webbing 22 is taken up on the spool 20 from the base end side thereof. When the spool 20 rotates in the take-up direction (the direction indicated by the arrow A of FIG. 1 as one side in the circumferential direction), the webbing 22 is taken up on the spool 20. Meanwhile, when the webbing 22 is pulled out from the spool 20, the spool 20 rotates in the pulled out direction (the direction indicated by the arrow B of FIG. 1 as the other side in the circumferential direction). The webbing 22 extends upward from the frame 12, and the webbing 22 is able to be worn by an occupant sitting on a seat of a vehicle.

A spiral spring (power spring) (not shown in the drawings) as a taking-up and biasing member is connected to the other end 20B of the spool 20, and the spiral spring is disposed at the front side of the frame 12 (the front side of the leg plate 12C). The spiral spring biases the spool 20 in the take-up direction, so that a biasing force in the take-up direction of the spool 20 acts on the webbing 22. For this reason, when the webbing 22 is worn by the occupant, the looseness of the webbing 22 is removed by the biasing force of the spiral spring. Also, when the wearing of the webbing 22 by the occupant is released, the webbing 22 can be taken up on the spool 20 by the entire amount (the maximum limit amount) due to the biasing force of the spiral spring.

At one end 20A of the spool 20, an accommodation hole 24 as an accommodation portion is formed, and the inside of the accommodation hole 24 is opened to the outside in the radial direction of one end 20A. An elongated plate-like lock pawl 26 as a regulation member constituting the lock mechanism 18 is movably accommodated inside the accommodation hole 24, and at one end of the lock pawl 26, lock teeth 26A id formed. A circular cylinder (columnar) operation shaft 28 as an operated portion is integrally provided at the lock pawl 26, and the operation shaft 28 protrudes rearward from the lock pawl 26.

A circular cylinder (columnar) rotation shaft 30 as a rotation portion is integrally provided at the one end 20A of the spool 20, and the rotation shaft 30 protrudes rearward from the spool 20 and is disposed so as to be coaxial with the spool 20.

A sensor mechanism 32 constituting the lock mechanism 18 is provided at the rear side of the frame 12 (the rear side of the leg plate 12B).

Figure 3:
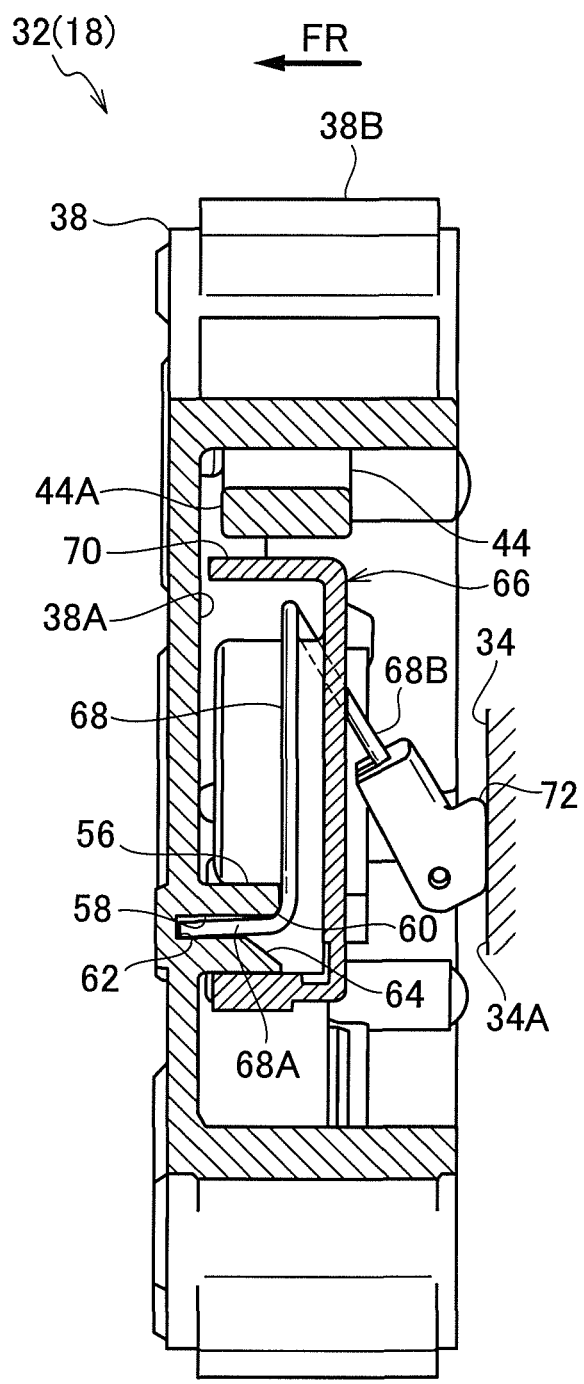
FIG. 3 is a cross-sectional view (a cross-sectional view taken along the line 3-3 of FIG. 2) illustrating a main part of the webbing take-up device according to the embodiment of the present invention.
Figure 4:
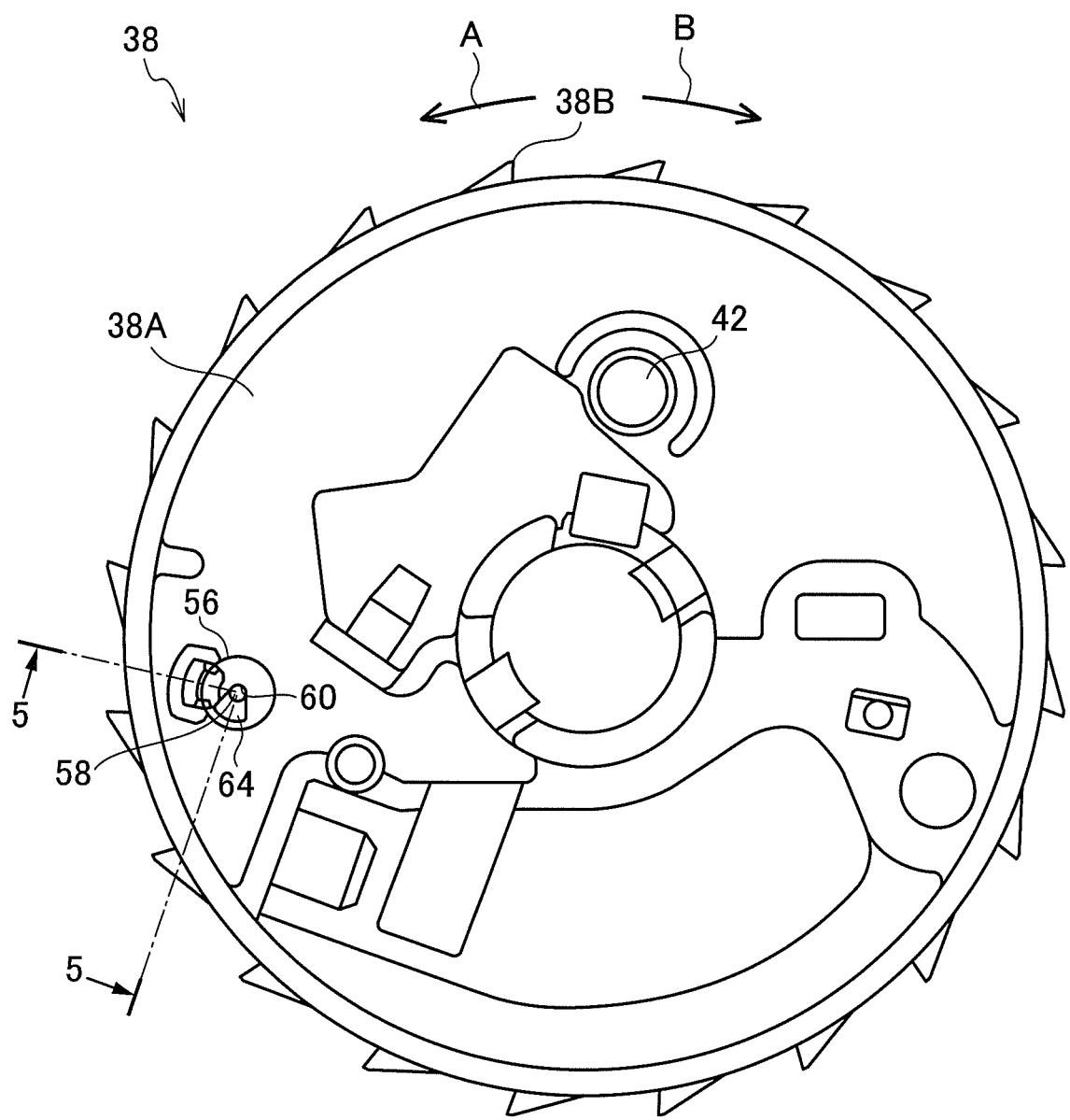
FIG. 4 is a front view illustrating a V-gear of the webbing take-up device according to the embodiment of the present invention when viewed from the rear side.
Figure 5:
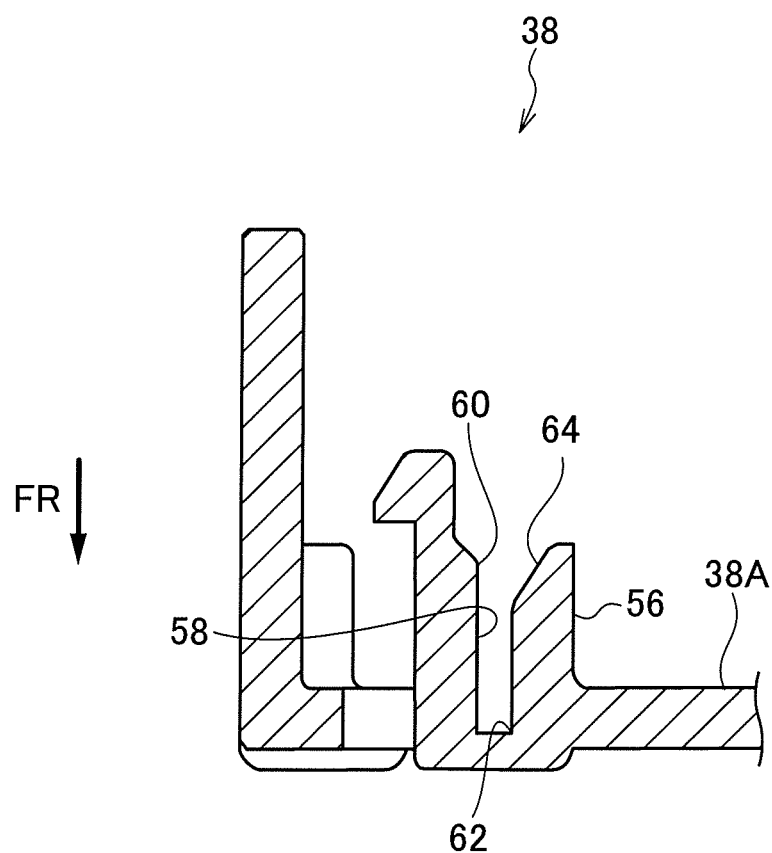
FIG. 5 is a cross-sectional view (a cross-sectional view taken along the line 5-5 of FIG. 4) illustrating the V-gear of the webbing take-up device according to the embodiment of the present invention.

At the sensor mechanism 32, a substantially resinous bottomed cylindrical sensor holder 34 is provided, and the sensor holder 34 is fixed to the leg plate 12B while the inside thereof is opened to the front side (the side of the leg plate 12B). The bottom surface inside of the sensor holder 34 is formed as a planar friction surface 34A (see FIG. 3), and the friction surface 34A is disposed so as to be perpendicular to the axial direction of the spool 20. A substantially resinous bottomed cylindrical sensor cover 36 is provided at the rear side of the sensor holder 34 (the opposite side to the leg plate 12B), and the sensor cover 36 is fixed to the leg plate 12B while the inner portion thereof is opened to the front side so as to accommodate the sensor holder 34.

A resinous bottomed cylindrical V-gear 38 as a rotation body is provided inside the sensor holder 34, and the inside of the V-gear 38 is opened to the rear side. The V-gear 38 is supported, so as to be coaxial with the rotation shaft 30 of the spool 20, at a bottom wall 38A, and the V-gear 38 is rotatable with respect to the spool 20.

At the bottom wall 38A of the V-gear 38, an elongated operation groove (not shown in the drawings) as an operation portion is formed, and the operation shaft 28 of the lock pawl 26 is movably inserted into the operation groove. A compression coil spring 40 as a rotating and biasing member is spanned between the V-gear 38 and the one end 20A of the spool 20, and the compression coil spring 40 biases the V-gear 38 in the pulled out direction with respect to the spool 20 (biases the spool 20 in the take-up direction with respect to the V-gear 38), so the operation shaft 28 abutting against the one end of the operation groove in the longitudinal direction. Accordingly, the rotation of the V-gear 38 with respect to the spool 20 in the pulled out direction due to the biasing force of the compression coil spring 40 is stopped, and the V-gear 38 is rotatable with the rotation of the spool 20. Further, the entire outer periphery of the V-gear 38 is formed with ratchet teeth 38B (outer teeth).

A circular cylinder (columnar) swing shaft 42 is integrally provided at the bottom wall 38A of the V-gear 38, and the swing shaft 42 protrudes, in parallel to the center axis of the V-gear 38, inside the V-gear 38 at a position offset from the center axis of the V-gear 38. A W-pawl 44 as an operation member and an inertia member is supported by the swing shaft 42 so as to be swingable (displaceable), and a straight bar-like return spring 46 as a returning and biasing member is spanned between the W-pawl 44 and the V-gear 38. The return spring 46 biases the W-pawl 44 in the return direction (the direction indicated by the arrow C of FIG. 1), and the swinging of the W-pawl 44 in the return direction due to the biasing force of the return spring 46 is stopped by the V-gear 38. A restriction portion 44A is integrally provided at the end of the W-pawl 44 at the take-up direction side, and the restriction unit 44A protrudes from the W-pawl 44 in the take-up direction side.

When the V-gear 38 rotates in the pulled out direction, a swinging force acts on the W-pawl 44 in the operation direction (the direction indicated by the arrow D of FIG. 1) by the inertia force in the take-up direction with respect to the V-gear 38. In addition, when the V-gear 38 abruptly rotates in the pulled out direction, the W-pawl 44 swings in the operation direction with respect to the V-gear 38 against the biasing force of the return spring 46, so the W-pawl 44 engages with the sensor holder 34 and the rotation of the V-gear 38 in the pulled out direction is stopped.

At the lower end of the sensor holder 34, an acceleration sensor 48 is provided. The acceleration sensor 48 is provided with a housing 50 which has a U-shaped cross-section, and the upper surface of the bottom wall of the housing 50 is provided with a concave curved surface 50A. The inside of the curved surface 50A is opened toward the upper side, and a spherical ball 52 as an inertia body is placed on the curved surface 50A. A substantially plate-like lever 54 is placed on the upper side of the ball 52, and the base end of the lever 54 is rotatably supported by the side wall of the housing 50. The V-gear 38 is disposed at the upper side of the leading end of the lever 54. When the ball 52 rises while rolling on the curved surface 50A of the housing 50, so the lever 54 rotates upward, so that the leading end engages with the ratchet teeth 38B of the V-gear 38 and the rotation of the V-gear 38 in the pulled out direction is stopped.

As described above, when the spool 20 rotates in the pulled out direction with respect to the V-gear 38 against the biasing force of the compression coil spring 40 at a time where the rotation of the V-gear 38 in the pulled out direction is stopped, the operation shaft 28 of the lock pawl 26 moves toward the other end side of the operation groove of the V-gear 38 in the longitudinal direction, and the lock pawl 26 moves toward the outside in the radial direction of the spool 20 (the one end 20A). Accordingly, the lock teeth 26A of the lock pawl 26 engage with the ratchet teeth 14A of the frame 12 (the leg plate 12B) so that the rotation of the spool 20 in the pulled out direction is locked (regulated), the pull-out of the webbing 22 from the spool 20 is locked (regulated).

As shown in FIGS. 2 to 5, a circular cylinder (columnar) support shaft 56 as a support portion is integrally formed at the bottom wall 38A of the V-gear 38 at the take-up direction side of the W-pawl 44, and the support shaft 56 protrudes inside the V-gear 38 so as to be parallel to the center axis of the V-gear 38.

A substantially circular support hole 58 is coaxially formed in the support shaft 56, and the support hole 58 is formed so that the rear side (the side of the friction surface 34A of the sensor holder 34) thereof is opened and the front side thereof extends into the bottom wall 38A. A peripheral (circumference) surface of the opening end (the rear end) of the support hole 58 at the pulled out direction side is formed as a catching portion 60, and a peripheral (circumference) surface of the closed end (the front end) of the support hole 58 at the take-up direction side is formed as an abut portion 62. At the opening side portion (the rear side portion) of the support hole 58, an enlarged portion 64 which has a fan-shape in the front view is formed, and the opening side portion of the support hole 58 is enlarged toward the take-up direction side at the entire peripheral (circumference) position other than a position where the catching portion 60 is formed due to the enlarged portion 64. The enlarged portion 64 is formed so as to have a triangular cross-section, and the enlarged portion 64 is formed from the same position in the axial direction of the support hole 58 for the catching portion 60 to the inner side position in the axial position of the support hole 58 further than the catching portion 60. For this reason, the opening side portion of the support hole 58 is formed so as to be non line-symmetric with respect to the center axis of the support hole 58 in the cross-section taken along the circumferential direction of the V-gear 38. Furthermore, the minimum diameter (the diameter at a portion other than a portion where the enlarged portion 64 is formed) of the support hole 58 is, for example, 0.6 mm.

A restriction body 66 is rotatably supported at the support shaft 56.

The restriction body 66 is provided with an elongated bar-like frictional spring 68 as a biasing portion, and at the base end of the frictional spring 68, a straight bar-like insertion portion 68A as a support portion. The insertion portion 68A is supported with being inserted into the support hole 58 of the support shaft 56, and the frictional spring 68 is rotatably supported by the support hole 58. A portion of the frictional spring 68, which is further toward the front end side than the insertion portion 68A, is formed as a substantially V-shaped bar-like main body portion 68B, and the main body portion 68B is disposed at the pulled out direction side with respect to the support hole 58. The base end side portion of the main body portion 68B (a portion at the insertion portion 68A side) is bent in perpendicular with respect to the insertion portion 68A and extends in the pulled out direction side. The leading end side portion of the main body portion 68B (a portion opposite to the insertion portion 68A side) extends toward the rear side (toward the friction surface 34A side of the sensor holder 34) as it goes from the base end side toward the leading end side. Furthermore, the diameter of the frictional spring 68 is, for example, 0.45 mm.

The restriction body 66 is provided with a resinous elongated rectangular parallelepiped restriction cover 70 as a restriction portion, and the restriction cover 70 is rotatably supported by fitting its base end to the outer peripheral surface of the support shaft 56, and extends from the support shaft 56 to the pulled out direction side. The restriction cover 70 accommodates the insertion portion 68A and the base end side portion of the main body portion 68B of the frictional spring 68 therein, and is assembled to the frictional spring 68. The restriction cover 70 is rotatable integrally with the frictional spring 68.

The restriction body 66 is provided with a resinous block-like frictional cover 72 as a friction portion. The frictional cover 72 accommodates the leading end of the frictional spring 68 (the leading end of the main body portion 68B) therein, and is assembled to the frictional spring 68. The friction cover 72 is rotatable integrally with the frictional spring 68. The frictional cover 72 contacts the friction surface 34A of the sensor holder 34 by the biasing force of the frictional spring 68. When the V-gear 38 rotates, the frictional cover 72 slides on the friction surface 34A, so that friction force is generated between the frictional cover 72 and the friction surface 34A.

Figure 2:
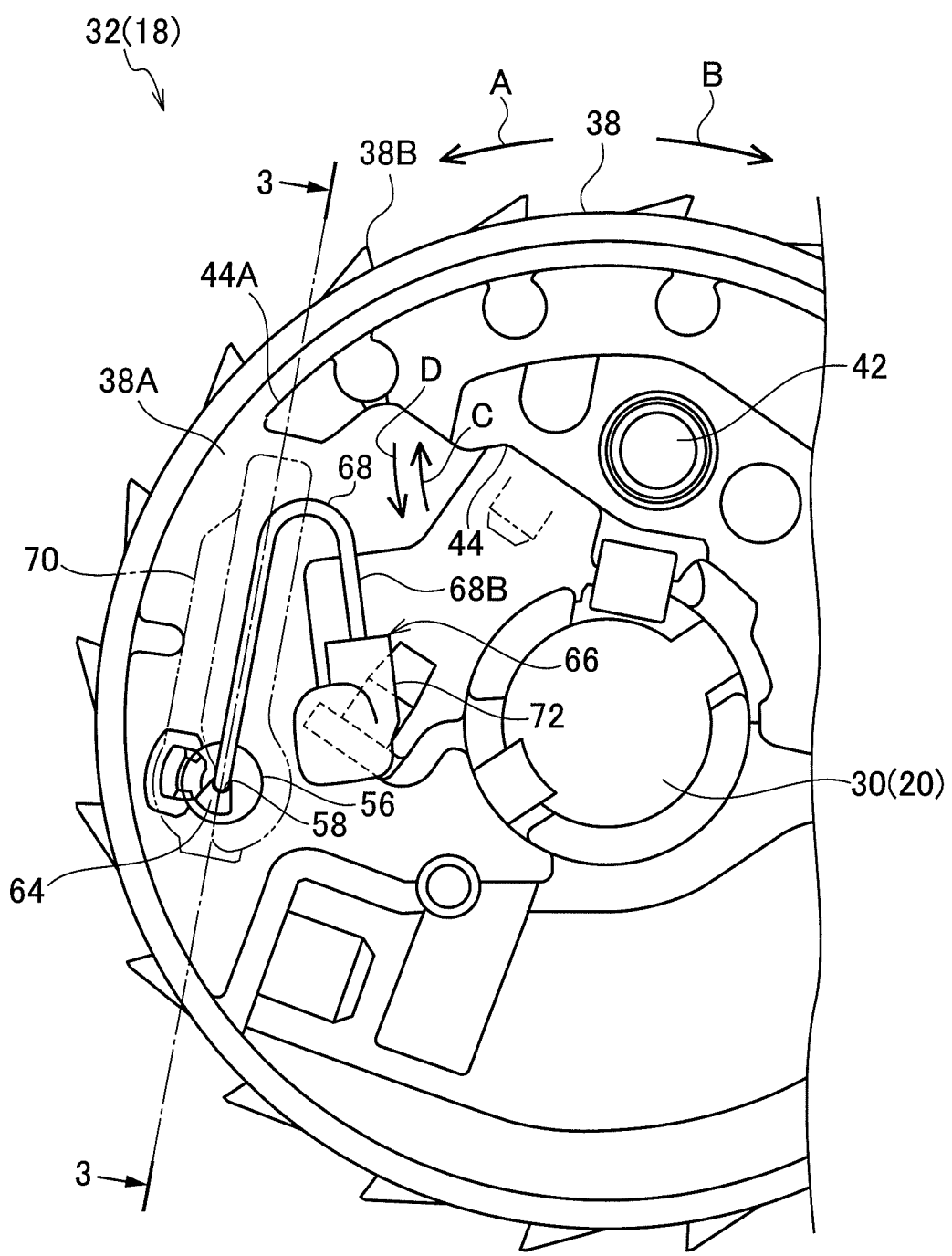
FIG. 2 is a front view illustrating a main part of the webbing take-up device according to the embodiment of the present invention when viewed from the rear side.

When the V-gear 38 rotates in the take-up direction, the restriction body 66 is rotated toward the outside in the radial direction of the V-gear 38 by the friction force generated in the frictional cover 72, and is rotated to the restriction position (see FIG. 2). For this reason, the leading end of the restriction cover 70 faces the restriction portion 44A of the W-pawl 44, so that the swinging of the W-pawl 44 with respect to the V-gear 38 in the operation direction is restricted.

Meanwhile, when the V-gear 38 rotates in the pulled out direction, the restriction body 66 is rotated toward the inside in the radial direction of the V-gear 38 by the friction force generated in the frictional cover 72 and is rotated to the permission position. For this reason, the state where the leading end of the restriction cover 70 faces the restriction portion 44A is released, so that the swinging of the W-pawl 44 with respect to the V-gear 38 in the operation direction is permitted.

When the restriction body 66 rotates between the restriction position and the permission position, the insertion portion 68A of the frictional spring 68 is always caught by (abutted with) the abut portion 62 and the catching portion 60 of the support hole 58, the inclination of the insertion portion 68A with respect to the support hole 58 due to the biasing force of the frictional spring 68 is stopped.

Next, the operation of the embodiment will be described.

In the webbing take-up device 10 with the above-described configuration, when the webbing 22 is pulled and the spool 20 and the V-gear 38 rotate in the pulled out direction against the biasing force of the power spring, the webbing 22 is pulled out from the spool 20 and is worn by the occupant.

When the vehicle is abruptly decelerated, the ball 52 rises while rolling on the curved surface 50A of the housing 50 in the acceleration sensor 48 and the lever 54 rotates upward so that the leading end engages with the ratchet teeth 38B of the V-gear 38. Accordingly, the rotation of the V-gear 38 in the pulled out direction is stopped.

When the vehicle is abruptly decelerated, the occupant moves due to the inertia. Accordingly, the webbing 22 is pulled out from the spool 20 by the occupant, and the spool 20 and the V-gear 38 abruptly rotate in the pulled out direction.

Further, when the V-gear 38 rotates in the pulled out direction, the restriction body 66 rotates toward the inside in the radial direction of the V-gear 38 by the friction generated between the frictional cover 72 and the friction surface 34A of the sensor holder 34, and rotates to the permission position. For this reason, the state where the leading end of the restriction cover 70 of the restriction body 66 faces the restriction portion 44A is released, so the swinging of the W-pawl 44 with respect to the V-gear 38 in the operation direction is permitted.

Accordingly, as described above, when the V-gear 38 abruptly rotates in the pulled out direction, the W-pawl 44 swings in the operation direction with respect to the V-gear 38 against the biasing force of the return spring 46 due to the inertia in the take-up direction with respect to the V-gear 38, so that the W-pawl 44 engages with the sensor holder 34 and the rotation of the V-gear 38 in the pulled out direction is stopped.

As described above, when the rotation of the V-gear 38 in the pulled out direction is stopped, the spool 20 rotates in the pulled out direction against the biasing force of the compression coil spring 40 with respect to the V-gear 38. Accordingly, the operation shaft 28 of the lock pawl 26 moves toward the other end side of the operation groove of the V-gear 38 in the longitudinal direction, and the lock pawl 26 moves toward the outside in the radial direction of the spool 20. Accordingly, due to the lock teeth 26A of the lock pawl 26 engaging with the ratchet teeth 14A of the frame 12 and the rotation of the spool 20 in the pulled out direction being locked, the pull out of the webbing 22 from the spool 20 is locked and the occupant is restrained by the webbing 22.

Meanwhile, when the wearing of the webbing 22 with respect to the occupant is released, the spool 20 and the V-gear 38 abruptly rotate in the take-up direction by the biasing force of the power spring, and the webbing 22 is taken up on the spool 20. When the webbing 22 is fully taken up on the spool 20 (when the winding of the webbing 22 on the spool 20 ends), there is a possibility that the spool 20 and the V-gear 38 abruptly rotate in the pulled out direction due to the reaction generated by the stop of the rotation in the take-up direction.

When the V-gear 38 rotates in the take-up direction, the restriction body 66 rotates toward the outside in the radial direction of the V-gear 38 by the friction force generated in the frictional cover 72 between the friction surface 34A of the sensor holder 34 and rotates to the restriction position. For this reason, the leading end of the restriction cover 70 of the restriction body 66 faces the restriction portion 44A of the W-pawl 44, so that the swinging of the W-pawl 44 with respect to the V-gear 38 in the operation direction is restricted.

Accordingly, as described above, in a case where the spool 20 and the V-gear 38 abruptly rotate in the pulled out direction due to the reaction generated by rotating being stopped in the take-up direction, even if the swinging force acts on the W-pawl 44 in the operation direction with respect to the V-gear 38 due to the inertia in the take-up direction with respect to the V-gear 38, the state of the restriction body 66 being rotated to the restriction position is maintained, so that the restriction cover 70 of the restriction body 66 restricts the swinging of the W-pawl 44 with respect to the V-gear 38 in the operation direction. For this reason, since the rotation of the V-gear 38 in the pulled out direction is not stopped without W-pawl 44 engaging with the sensor holder 34, the V-gear 38 rotates integrally with the spool 20 in the pulled out direction, so the lock pawl 26 does not move toward the outside in the radial direction of the spool 20. Thus, the lock teeth 26A of the lock pawl 26 do not engage with the ratchet teeth 14A of the frame 12 and the rotation of the spool 20 in the pulled out direction is not locked, it is possible to prevent or suppress the lock of the pulling out of the webbing 22 from the spool 20 (so-called end lock) and to pull out the webbing 22 from the spool 20.

The insertion portion 68A of the frictional spring 68 of the restriction body 66 is inserted into and supported by the support hole 58 of the support shaft 56 at the bottom wall 38A of the V-gear 38, and the insertion portion 68A is caught by the abut portion 62 and the catching portion 60 of the support hole 58, so the inclination of the insertion portion 68A with respect to the support hole 58 due to the biasing force of the frictional spring 68 is stopped.

Here, at the opening side portion of the support hole 58, the enlarged portion 64 is formed, and the support hole 58 is enlarged such that the opening side portion thereof is enlarged (expanded) at a circumferential position other than a position of the catching portion 60 compared to the position of the catching portion 60. For this reason, even if the minimum diameter of the support hole 58 (the diameter of the portion other than the portion where the enlarged portion 64 is formed) is made to ne small in order to improve the supporting performance of the frictional spring 68 by the support hole 58 by suppressing the inclination of the insertion portion 68A with respect to the support hole 58, it is possible to improve the strength of the portion for molding (forming) the support hole 58 in a mold (metal mold) (not shown in the drawings) that molds (forms) the V-gear 38, hence the lifetime of the mold can be longer.

In addition, when the restriction body 66 rotates between the restriction position and the permission position, the insertion portion 68A of the frictional spring 68 is always caught (anchored) by the abut portion 62 and the catching portion 60 of the support hole 58, so the inclination of the insertion portion 68A with respect to the support hole 58 due to the biasing force of the frictional spring 68 is stopped. For this reason, even when the restriction body 66 rotates between the restriction position and the permission position, it is possible to always suppress the inclination of the insertion portion 68A with respect to the support hole 58 and hence to improve the support performance of the frictional spring 68 by the support hole 58.

Further, the enlarged portion 64 is formed (extended) up to a position further toward the inner side in the axial direction of the support hole 58 than the position of the catching portion 60 of the support hole 58. For this reason, it is possible to further improve the strength of the molding portion for the support hole 58 in the mold that molds the V-gear 38 and hence to further make long the lifetime of the mold.

In addition, the support shaft 56 is disposed in the entire circumferential direction of the support hole 58. For this reason, it is possible to suppress the insertion portion 68A of the frictional spring 68 from being separated out from the support hole 58 before the assembly of the sensor holder 34 and the V-gear 38.

Furthermore, in the embodiment, it suffices that the catching portion 60 is provided at at least the circumferential range of the support hole 58 by which range the insertion portion 68A of the frictional spring 68 is caught when the restriction body 66 rotates between the restriction position and the permission position, and the enlarged portion 64 is provided at a circumferential range other than the circumferential range of the support hole 58.

In addition, in the embodiment, the support shaft 56 is provided at the entire circumferential position of the support hole 58. However, the support shaft 56 may not be provided at the circumferential position other than the position of the catching portion 60 of the support hole 58.

Further, in the embodiment, the enlarged portion 64 is provided at the support hole 58 at the catching portion 60 side. However, in a case in which the end surface at the abut portion 62 side in the support hole 58 is opened, the enlarged portion 64 may be provided at the abut portion 62 (the catching portion) side at the support hole 58.

What is claimed is:

1. A webbing take-up device comprising:
   a take-up shaft configured to be able to take-up a webbing which is worn by an occupant, the webbing being taken-up by rotating in a take-up direction and the webbing being pulled out by rotating in a pulled out direction;
   a rotation body that is provided with a support hole at which a catching portion and an enlarged portion are provided in a circumferential direction of the support hole, the support hole being enlarged at a position of the enlarged portion compared to at a position of the catching portion, and the rotation body being rotatable with rotation of the take-up shaft;
   a regulation member that regulates rotation of the take-up shaft in a pulled out direction by being operated;
   an operation member that is provided in the rotation body, the regulation member being operated by the operation member being displacing when the rotation body rotates in the pulled out direction at a predetermined speed or more; and
   a restriction body that is provided with a frictional spring having an insertion portion that is supported by the support hole such that the insertion portion is inserted in the support hole, the restriction body being movable between a permission position and a restriction position due to a friction force being generated when the rotation body is rotated in a state in which inclination of the insertion portion with respect to the support hole is stopped by the catching portion, the restriction body moving, when the rotation body rotates in the pulled out direction, to the permission position so as to permit displacement of the operation member, and the restriction body moving, when the rotation body rotates in the take-up direction, to the restriction position so as to restrict displacement of the operation member,
   wherein the frictional spring is bent substantially perpendicular with respect to the insertion portion so as to extend from the insertion portion toward one side the catching portion provided at the one side of the support hole, the enlarged portion is provided at another side of the support hole, the another side being a side opposite to the one side such that the enlarged portion is provided at a different portion of the support hole from the catching portion.

2. The webbing take-up device of claim 1, wherein the enlarged portion is provided up to a position further toward an inner side in an axial direction of the support hole than the catching portion.

3. The webbing take-up device of claim 2, wherein:
   one end of the support hole is opened, and
   the catching portion and the enlarged portion are formed at an opening end side of the support hole.

4. The webbing take-up device of claim 1, wherein:
   one end of the support hole is opened, and
   the catching portion and the enlarged portion are formed at an opening end side of the support hole.

5. The webbing take-up device of claim 1, wherein:
   the insertion portion has a distal and a proximal end, the distal end being pivotally supported by the support hole, and the catching portion simultaneously contacting and supporting the proximal end of the insertion portion such that inclination of the insertion portion with respect to the support hole is stopped by the catching portion.

* * * * *